United States Patent Office 2,953,591
Patented Sept. 20, 1960

---

2,953,591

PHOSPHONIC ACID PHOSTONES

Albert Y. Garner, Springfield, Mass., assignor to Monsanto Chemical Company, St. Louis, Mo., a corporation of Delaware No Drawing. Filed May 7, 1958, Ser. No. 733,498

6 Claims. (Cl. 260—461)

This invention relates to the phosphorous analogs of the lactones. More particularly, it relates to the intramolecular esters of phosphonic acids corresponding to the general formula:

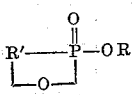

wherein R and R' are groups as hereinafter disclosed.

U.S. 2,648,695 issued to C. W. Smith describes intramolecular esters of hydroxy-substituted saturated phosphinic acids. The term "phostones" was coined therein to designate, in general, compounds comprising the phosphorous analogs of the lactones.

It is an object of this invention to provide a new class of phostones.

Another object is to provide novel phostones derived from phosphonic acid esters.

These and other objects are attained by reacting an organic phosphite with a dihalogenated hydrocarbon at a temperature of from 100–250° C. The organic phosphites employed correspond to the general formula:

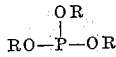

wherein at least one R is a hydrocarbon radical and the remaining R's are either hydrogen or alkali metal radicals. The dihalogenated hydrocarbons employed correspond to the general formula:

X—R'—X wherein X represents halogen atoms and R' is a divalent hydrocarbon radical wherein the two free valencies are located on different carbon atoms which are separated from each other by at least 1 but not more than 3 intervening aliphatic carbon atoms.

The following examples are given in illustration of the invention and are not intended as limitations thereon.

Example I

A mixture of 101 grams (about 0.5 mol) of 1,3-dibromopropane and 170 grams (about 1.0 mol) of triethylphosphite is charged to a reaction vessel. The reaction mixture is heated to an initial temperature of 130° C. and it is reacted for about 2½ hours, the reaction temperature being maintained within the range of from 130–170° C. Ethylbromide is continuously distilled from the reaction mixture during the course of this reaction. Fractional vacuum distillation of the reaction mixture yields 14 grams (about 0.1 mol) of colorless, liquid ethyl propylphosphonic acid phostone

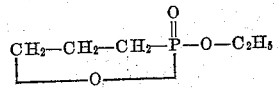

as the fraction boiling at about 106° C. under a pressure of 2 mm. of Hg. The yield is about 20% based upon the 1,3-dibromopropane.

Example II

A mixture of 166 grams (about 1.0 mol) of triethylphosphite and 64 grams (about 0.5 mol) of 1,4-dichlorobutane is charged to a reaction vessel. The reaction mixture is heated to an initial temperature of 155° C. and is reacted for 20 hours, the reaction temperature being maintained within the range of from 155–185° C. Ethylchloride is continuously distilled from the reaction mixture during the course of this reaction. Fractional vacuum distillation of the reaction mixture yields 16 grams (about 0.1 mol) of colorless liquid ethyl butylphosphonic acid phostone

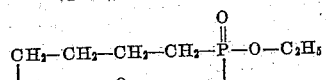

as the fraction boiling at about 100° C. under a pressure of 1 mm. of Hg. The yield is about 20% based upon the 1,4-dichlorobutane.

Example III

A mixture of 46 grams (about 0.2 mol) of 1,5-dibromopentane and 30 grams (about 0.1 mol) of triphenylphosphite is charged to a reaction vessel. The reaction mixture is heated to an initial temperature of 160° C. and is reacted for 5 hours, the reaction temperature being maintained within the range of from 160–185° C. The bromobenzene formed during the reaction is removed by distillation at atmospheric pressure. Fractional distillation of the residual reaction mixture yields phenyl amylphosphonic acid phostone

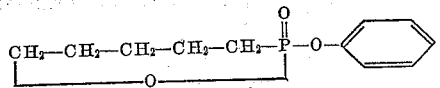

as the fraction boiling at about 112° C. under a pressure of 1 mm. of Hg. The yield is about 45% based upon the triphenylphosphite.

The organic phosphites employed in this invention correspond to the general formula:

At least one of these R groups must be a hydrocarbon radical and preferably all 3 are hydrocarbon radicals, either the same or mixed. However, up to 2 of these R groups may be either hydrogen or alkali metal radicals. Thus, these organic phosphites are the mono-, di- or tri-substituted esters of phosphorous acid or the alkali metal salts thereof. Examples of such include:

(a) mono-substituted phosphorous acid esters: monopropylphosphite (sodium salt), mono-ethylphosphite, etc.

(b) di-substituted phosphorus acid esters: dimethylphosphite, dipropylphosphite, di-isopropylphosphite, di-isoamylphosphite, di-n-hexylphosphite, diphenylphosphite, etc.

(c) tri-substituted phosphorous acid esters: trimethylphosphite, triethylphosphite, tributylphosphite, triphenyl phosphite, tri-(2-methyl hexyl) phosphite, tri-(4-tertiary butyl-hexyl) phosphite, etc.

The dihalogenated hydrocarbons employed in this invention are those wherein the 2 halogen atoms are located upon different carbon atoms which in turn are separated by at least 1 but not more than 3 carbon atoms. In other words these dihalogenated hydrocarbons are 1,3-dihalo-, 1,4-dihalo and 1,5-dihalo-aliphatic hydrocarbons and the aryl- and aralkyl-substituted derivatives thereof. Examples of such dihalogenated hydrocarbons include: 1,3-dichloropropane, 1,3-dichlorohexane, 1,3-dibromo-4-tolylbutane, 1,4-dichlorobutane, 1,4-dibromo-5-phenylpentane, 1,5-dibromopentane, 1,5-dichloro-2-ethylpentane, etc.

In preparing the phostones of this invention, the organic phosphite and the dihalogenated hydrocarbon are reacted in a suitable reaction vessel at a temperature of from 100–250° C. over a period of from 1–40 hours. In a preferred embodiment, the reaction temperature is maintained at from 130–200° C. to attain a more uniform reaction and a higher yield. Theoretically, equimolar proportions of organic phosphite and dihalogenated hydrocarbon are reacted. However, it has been found that higher yields of phostones are obtained if an excess of the dihalogenated hydrocarbon is used.

Organic or hydrogen halides corresponding to the formula, R—X, wherein R and X are radicals as hereinbefore described, are formed as the by-products of this reaction. In a preferred embodiment of this invention, the R—X compounds formed have a lower boiling point than the phostone and either of the reactants, i.e., the phosphite and the dihalogenated hydrocarbon, and are continuously distilled from the reaction mixture during the course of the reaction. This must, of course, be accomplished at a reaction temperature below the 250° C. maximum, conducting the reaction at sub-atmospheric pressure if necessary. One of the advantages of such a process is the obtainment of an increased phostone yield due to a more favorable reaction equilibrium.

Recovery of the phostone from the final reaction mixture is accomplished according to conventional techniques. For example, the phostone may be separated from the residual phosphite and dihalogenated hydrocarbon, and the R—X by-product if not previously removed, by fractional distillation at reduced pressure, etc.

The phostones of this invention are non-inflammable compounds corresponding to the general formula:

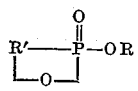

wherein R is either a hydrogen, hydrocarbon or alkali metal radical and R' is a divalent hydrocarbon radical wherein the two free valencies are located on different carbon atoms which are separated from each other by at least 1 but not more than 3 intervening aliphatic carbon atoms. The two free valencies of R' are chemically combined with the phosphorous and oxygen atoms respectively.

These phostones are chemically stable over a broad temperature range. They also have a valuable combination of properties in that they combine relatively low freezing points with relatively high boiling points. For example ethyl butylphosphonic acid phostone freezes at below —80° C. and boils at about 290° C. at atmospheric pressure, remaining relatively free flowing under both extremes of temperature.

By reason of the above properties, the phostones of this invention are especially attractive as non-inflammable hydraulic fluids for, e.g., aircraft hydraulic systems, hydraulic presses, etc. The lower molecular weight phostones are fluids at room temperature and are ideally suited for such hydraulics applications. Similarly, the higher molecular weight phostones, which are solids at room temperature, may be used as hydraulic fluids in high temperature applications.

The phostones of this invention have also been found to be useful as plasticizers and/or fire-retardants for plastics. A normally inflammable plastic, wherein from 0.1–5% by weight of a phostone has been incorporated, is slowly consumed while held in a flame, but will extinguish itself once the flame is removed.

*Example IV*

Two batches, A and B, of a polystyrene molding powder are intimately blended in the following formulations.

|  | Batch A | Batch B |
| --- | --- | --- |
| Polystyrene molding powder_____lbs__ | 5.0 | 5.0 |
| Zinc Stearate_____grm__ | 0.9 | 0.9 |
| Phostone of Example III_____grm__ | 40.0 | none |

The two blends are then extruded and molded into test slabs measuring 3" x 7" x 0.150". A slab molded from Batch A is held in a Bunsen flame and is observed to slowly char and burn. Upon removal from the flame, the slowly burning slab extinguishes itself. A slab molded from Batch B is held in a Bunsen burner flame and is very rapidly ignited. Combustion of this slab continues even after it is removed from the Bunsen flame, until it is reduced to ash.

Other inflammable plastics which may be made fire-resistant with the phostones of this invention include, for example, polyvinyl chloride, polyethylene, polyurethanes, phenolformaldehyde condensates, etc. These phostones may also be employed to prevent the so-called "punking" of foamed phenolformaldehyde condensation resins, especially in boat-hull insulation applications wherein puncture by, e.g., enemy shells, presents a serious problem. In many cases the phostones used should be selected in accordance with the plastic into which it is being incorporated. For example, to insure lasting compatibility, a phostone such as that of Example III which contains a phenoxy-group was selected for use in the polystyrene molding compound in Example IV.

It is obvious that many variations may be made in the products and processes set forth above without departing from the spirit and scope of this invention.

What is claimed is:

1. As novel compositions of matter, phostones corresponding to the general formula:

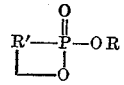

wherein R is a radical selected from the group consisting of hydrogen and alkali metal radicals and monovalent hydrocarbon radicals free of olefinic and acetylenic unsaturation and R' is a divalent saturated hydrocarbon radical wherein the two free valencies are located on different carbon atoms which are separated from each other by at least 1 and not more than 3 intervening aliphatic carbon atoms, said free valencies being chemically combined with the respective atoms designated in said formula by P and O.

2. As novel compositions of matter, phostones corresponding to the general formula:

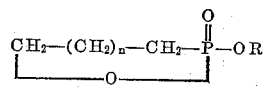

wherein n is an integer of from 1–3 and R is a radical selected from the group consisting of hydrogen and alkali metal radicals and monovalent hydrocarbon radicals free of olefinic and acetylenic unsaturation.

3. A process for the preparation of phostones which comprises reacting at a temperature of from 100–250° C. (1) an organic phosphite selected from the group consisting of the mono-, di- and tri-substituted esters of phosphorous acid which correspond to the general formula:

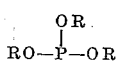

wherein at least one R is a monovalent hydrocarbon radical free of olefinic and acetylenic unsaturation and the remainder thereof are selected from the group consisting of hydrogen and alkali metal radicals and (2) a dihalogenated hydrocarbon wherein the halogen atoms are located on different carbon atoms which are separated from each other by at least 1 and not more than 3 intervening carbon atoms.

4. A process as in claim 3 wherein each R of the organic phosphite is a monovalent hydrocarbon radical free of olefinic and acetylenic unsaturation.

5. A process for the preparation of phostones which comprises reacting at a temperature of from 100–250° C. (1) an organic phosphite selected from the group consisting of the mono-, di- and tri-substituted esters of phosphorous acid which correspond to the general formula:

$$RO-\underset{\underset{OR}{|}}{P}-OR$$

wherein at least one R is a monovalent hydrocarbon radical free of olefinic and acetylenic unsaturation and the remainder thereof are selected from the group consisting of hydrogen and alkali metal radicals and (2) a dihalogenated hydrocarbon corresponding to the general formula:

$$X-CH_2-(CH_2)_n-CH_2-X$$

wherein $n$ is an integer of from 1–3 and X is a halogen radical.

6. A process as in claim 5 wherein each R of the organic phosphite is a monovalent hydrocarbon radical free of olefinic and acetylenic unsaturation.

References Cited in the file of this patent

UNITED STATES PATENTS

| | | |
|---|---|---|
| 2,254,124 | Stevens et al. | Aug. 26, 1941 |
| 2,648,695 | Smith | Aug. 11, 1953 |